United States Patent [19]
Kawai et al.

[11] Patent Number: 5,676,101
[45] Date of Patent: Oct. 14, 1997

[54] CONTROLLERS FOR A COMBUSTION ENGINE ABLE TO LOWER THE INTAKE AIR PRESSURE TO A VACUUM DURING AN ENGINE CRANKING OPERATION

[75] Inventors: Takashi Kawai; Hiroshi Tanaka; Naohide Fuwa, all of Susono, Japan

[73] Assignee: Toyota Jidosha Kabushiki Kaisha, Aichi, Japan

[21] Appl. No.: 641,546

[22] Filed: May 1, 1996

[30] Foreign Application Priority Data

May 23, 1995 [JP] Japan ................................. 7-123597
Feb. 9, 1996 [JP] Japan ................................. 8-24162

[51] Int. Cl.[6] ............................... F02D 9/02; F02D 41/06
[52] U.S. Cl. .............................. 123/179.18; 123/184.53
[58] Field of Search .......................... 123/179.18, 179.16, 123/184.53

[56] References Cited

U.S. PATENT DOCUMENTS 4,043,310 8/1977 Ichimiya et al. .................... 123/179.18

FOREIGN PATENT DOCUMENTS 57-162944 10/1982 Japan .
63-143349 6/1988 Japan .
1-119874 8/1989 Japan .

Primary Examiner—Andrew M. Dolinar
Attorney, Agent, or Firm—Oliff & Berridge

[57] ABSTRACT

The object of the present invention is to provide a controller, for a combustion engine, having a simple structure and which can reduce the exhaust emissions at the engine start-up time. The controller comprises a means for decreasing the pressure in an intake air passage downstream of a throttle valve during the engine cranking operation. A controller comprises an air pump, a means for communicating an inlet of the air pump either to the atmosphere or to an intake air passage downstream of a throttle valve, and a means for changing the inlet of the air pump from the atmosphere to the intake air passage downstream of the throttle valve and to activate the air pump during the engine cranking operation. Another controller comprises a vacuum tank, for example, a brake-booster instead of the air pump that enables it to more quickly reduce the air pressure in the intake air passage downstream the throttle valve.

5 Claims, 7 Drawing Sheets

|  | YSTAP = 1 | YSTAP = 0 |
|---|---|---|
| AIR PUMP | ON | — |
| FIRST ELECTROMAGNETIC VALVE 12 | COMMUNICATE THE FIRST PORT 12a WITH THE SECOND PORT 12b | COMMUNICATE THE FIRST PORT 12a WITH THE THIRD PORT 12c |
| SECOND ELECTROMAGNETIC VALVE 14 | ON | — |

CONTROLLERS FOR A COMBUSTION ENGINE ABLE TO LOWER THE INTAKE AIR PRESSURE TO A VACUUM DURING AN ENGINE CRANKING OPERATION

BACKGROUND OF THE INVENTION

1. Field of the Invention

The present invention relates to controllers for a combustion engine having an air pump or a vacuum tank.

2. Description of the Related Art

In a gasoline engine that injects fuel into an intake pipe downstream of a throttle valve, an intake pipe and a large capacity tank called a surge tank, located between the throttle valve and each intake valve for each combustion chamber of the engine, are generally provided. The total volume of the surge tank may be, for example, the same as the gas exhausted in a combustion cycle of the engine.

Therefore, at the engine start-up time, even if the throttle valve is closed, approximately the same volume of air as that which may exist in full throttle operation exists in the surge tank because air leaks through the gap in the throttle valve by the engine start-up time. This large amount of air, more than required, is sucked into the combustion chambers at the engine start-up time. As the air in the intake pipe and the surge tank is not a vacuum, the injected fuel cannot be atomized, the fuel is deposited onto the inner wall of the intake pipe, the amount of fuel actually sucked into the combustion chambers is reduced, and the mixture of air and fuel in the combustion chambers becomes overlean. Then, as the air pressure in the intake pipe is lowered to vacuum, the fuel deposited on the inner wall is suddenly sucked into the combustion chambers, and thus the mixture becomes overrich. This causes unstable engine start up in terms of combustion and increases the exhaust emissions.

On the other hand, as exhaust gas emission restrictions have been tightened, it is important to decrease the exhaust emissions at engine start up. Therefore, various apparatuses to solve the above problems have been proposed.

For example, an apparatus, wherein shutoff valves are arranged in an intake air passage downstream of a throttle valve, that controls the shutoff valves to fully close the intake air passage at the engine start-up time so as to prevent a large amount of air from flowing into combustion chambers and to keep the air pressure in the intake air passage a vacuum, thereby fuel atomization can be improved and the exhaust emissions, in particular the HC emission, can be reduced, is known (please refer to Japanese Unexamined Patent Publication No. 63-143349 and the Japanese Unexamined Utility Model Publication No. 1-119874.).

However, in such an apparatus for a multi-cylinder engine requires many shutoff valves which makes the structure of the intake air system complicated and increases the cost therefore.

SUMMARY OF THE INVENTION

The present invention has been made in view of the foregoing problems and it is therefore an object of the present invention to provide a controller for a combustion engine having a simple structure and able to reduce the exhaust emissions at the engine start-up time.

In order to accomplish the above object, a controller for a combustion engine according to a first aspect of the present invention is characterized in that it comprises a means for decreasing air pressure in an intake air passage downstream of a throttle valve during the engine cranking operation.

A controller for a combustion engine according to a second aspect of the present invention is characterized in that it comprises an air pump, a means for communicating an inlet of the air pump either to the atmosphere or to an intake air passage downstream of a throttle valve, and a means for changing the inlet of the air pump from the atmosphere to the intake air passage downstream of the throttle valve, and to activate the air pump, during the engine cranking operation.

A controller for a combustion engine according to a third aspect of the present invention is characterized in that it comprises a vacuum tank, a means for opening or closing a passage between the vacuum tank and an intake air passage downstream of a throttle valve, and a means for controlling the passage to be opened during the engine cranking operation.

In the controller according to the third aspect of the present invention, the vacuum tank may be made from a brake-booster.

The controller according to the third aspect of the present invention, further comprises a means for keeping the throttle valve open to a predetermined degree of the opening, and a means for shutting off the air flowing from upstream to downstream of the throttle valve before opening the passage between the vacuum tank and the intake air passage downstream of the throttle valve.

In the controller according to the first to third aspects of the present invention, air in the intake air passage downstream of the throttle valve is actively pumped out to create a vacuum during the engine cranking operation, the amount of the air sucked into the each combustion chamber is reduced, injected fuel is well atomized, the exhaust emissions, in particular the unburned HC emission, at the first expansion stroke of the engine, are decreased, and the amount of the fuel deposited onto the inner wall of the intake pipe is decreased, and production of overrich mixture of air and fuel in the combustion chambers after the engine cranking operation can be avoided.

In the controller according to the second aspect of the present invention, the air in the intake air passage downstream of the throttle valve is sucked during the engine cranking operation by means of the air pump, thereby lowering the air pressure in the intake pipe to the higher degree of vacuum.

In the controller according to the third aspect of the present invention, a passage between the intake air passage downstream of the throttle valve and the vacuum tank is opened during the engine cranking operation, thereby lowering the air pressure in the intake pipe to a higher degree of vacuum. Since the vacuum tank is used, the air pressure in the intake pipe can be more quickly lowered as compared with the air pump, thereby injected fuel can be more atomized and the exhaust emissions, in particular the unburned HC emission, at the first expansion stroke of the engine, can be more decreased as compared with the second aspect of the present invention.

In the controller according to the third aspect of the present invention, a brake-booster, as installed in most of vehicles, is used for the vacuum tank and the additional cost required to carry out the present invention can be minimized.

In the controller according to the third aspect of the present invention, even in a case of a combustion engine having a means for keeping the throttle valve open to a predetermined degree of opening, for example, in a case of a throttle opener, first the air flowing from upstream to downstream of the throttle valve is shut off, then the passage between the vacuum tank and the intake air passage downstream of the throttle valve during the engine cranking operation is opened, thus the air pressure in the intake pipe can be surely lowered to a higher degree of vacuum.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

The preferred embodiments of the present invention that actively decrease the air pressure in the intake air passage downstream of the throttle valve will be described below with reference to the accompanying drawings.

Figure 1:
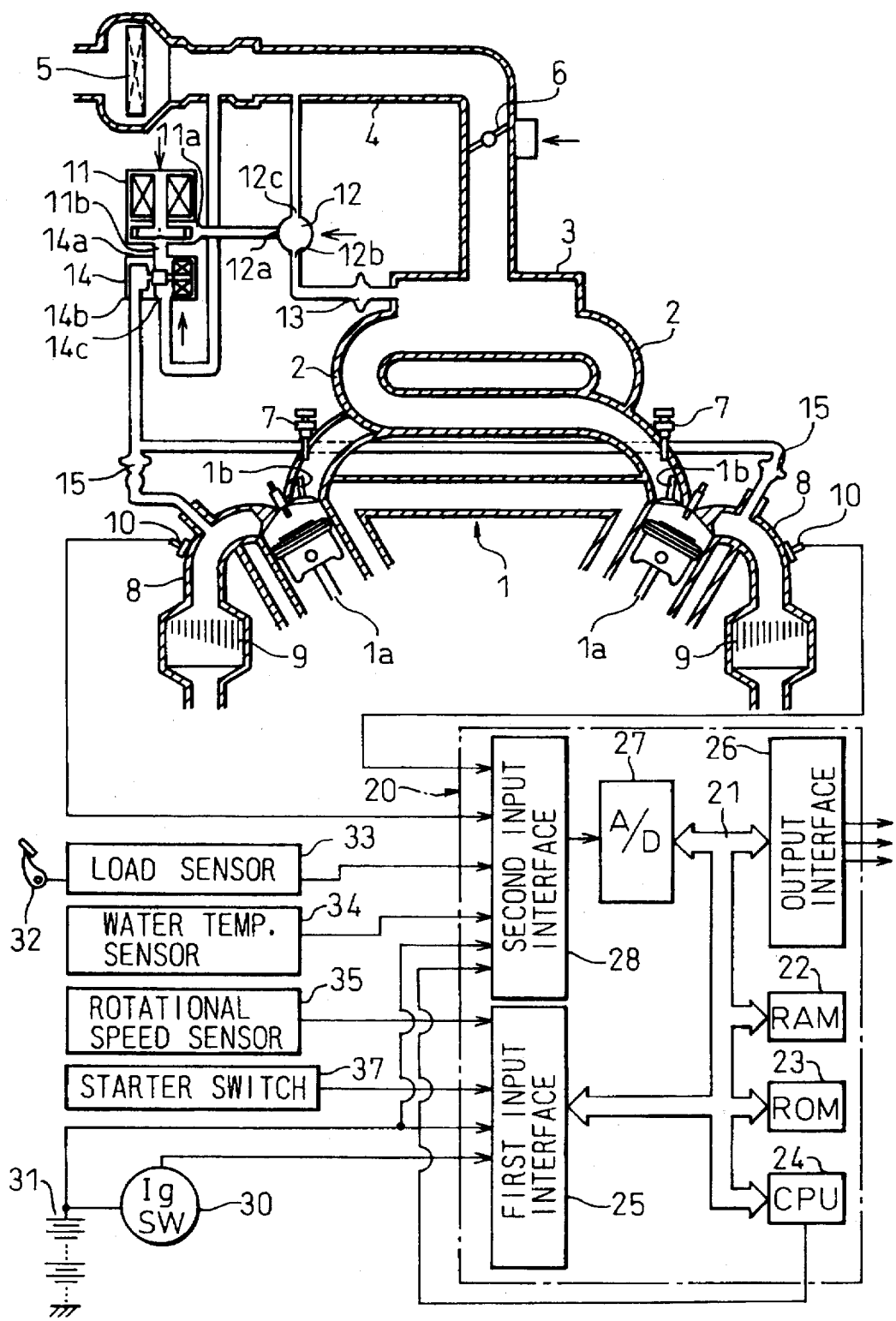
FIG. 1 is a diagram showing a general structure according to a first embodiment of the present invention.

FIG. 1 is a diagram showing a general structure according to a first embodiment of the present invention. In FIG. 1, reference number 1 denotes an engine block in which a plurality of cylinders are arranged in the shape of V, and 1a denotes each of the cylinders. The each cylinder 1a is connected to a surge tank 3 common to each cylinder 1a via each corresponding part of an intake manifold 2. The surge tank is connected to an air cleaner 5 via an intake duct 4. A throttle valve 6 is arranged in the intake duct 4. Furthermore, a fuel injection valve 7 is arranged in front of an intake valve 1b for the each cylinder 1a in the intake manifold 2. On the other hand, the each cylinder 1a is connected to each corresponding part of an exhaust manifold 8 provided with a catalytic converter 9. In the exhaust manifold 8, upstream of the catalytic converter 9, an O₂ sensor 10 that detects the concentration of oxygen in an exhaust gas of the engine is arranged. An air pump 11 is arranged to supply a secondary atmospheric air into the exhaust manifold 8 upstream of the O₂ sensor 10 depending on necessity so that the exhaust gas can be sufficiently purified by means of the catalytic converter 9.

The air pump 11 is motor driven type, 11a denotes an inlet port and 11b denotes an outlet port, of the pump 1. A first electromagnetic valve 12 includes a first port 12a, a second port 12b and a third port 12c. The first port 12a can be communicated with the second port 12b or the third port 12c in response to a signal controlled by an electronic control unit (ECU) 20.

The first port 12a of the first electromagnetic valve 12 is connected to the inlet port 11a of the air pump 11, the second port 12b is connected to the surge tank 3 via a check valve 13, and the third port 12c is connected to the intake duct 4 located between the air cleaner 5 and the electronic throttle valve 6. Thus, the inlet port 11a can be selectively connected to the surge tank 3 or the intake duct 4 located between the air cleaner 5 and the electronic throttle valve 6.

A second electromagnetic valve 14 includes a first port 14a, a second port 14b and a third port 14c. The first port 14a is connected to the outlet port 11b of the air pump 11, the second port 14b is connected to each corresponding part of the exhaust manifold 8 to the each cylinder 1a of the engine 1 via a check valve 15, and the third port 14c is connected to the intake duct 4 upstream of the electronic throttle valve 6. Another valve (not shown) provided in the second electromagnetic valve 14 is controlled by the ECU 20 with an output signal thereof so that the secondary air can be appropriately supplied into the exhaust manifold 8.

The electronic control unit (ECU) 20 is made of a digital computer system, which comprises a random access memory (RAM) 22, a read only memory (ROM) 23, a central processing unit (CPU) 24, a first input interface circuit 25, an output interface circuit 26, an A/D converter 27, and a second input interface circuit 28 for inputting analog signals from sensors or the like to the A/D converter 27. These are mutually connected through a bi-directional bus 21.

A battery 31 is connected to the ECU 20 via an ignition switch 30 as a power supply. The battery voltage is applied to the A/D converter 27 via the second interface circuit 28 as a signal. An ON/OFF signal of the ignition switch 30 is also input to the first interface circuit 25.

An accelerator pedal 32 is connected to a load sensor 33 that generates an output signal proportional to the amount of pressure on the pedal 32. The output signals of the load sensor 33 and a water temperature sensor 34 for detecting the engine coolant temperature are respectively connected to the A/D converter 27 via the second interface circuit 28. Input signals of a rotational speed sensor 35 for detecting the engine rotational speed and a starter switch 37 are respectively input to the first interface circuit 25.

On the other hand, the output interface circuit 26 is connected to the electronic throttle valve 6, the air pump 11, the first electromagnetic valve 12 and the second electromagnetic valve 14 for activating these. The ECU 20 is, of course, used for basic controls such as fuel injection control and ignition timing control. The explanations of the basic controls are omitted. Next, the control method of the controller for a combustion engine having the air pump according to the first embodiment of the present invention as explained in FIG. 1 will be explained referring to FIG. 2.

Figure 2:
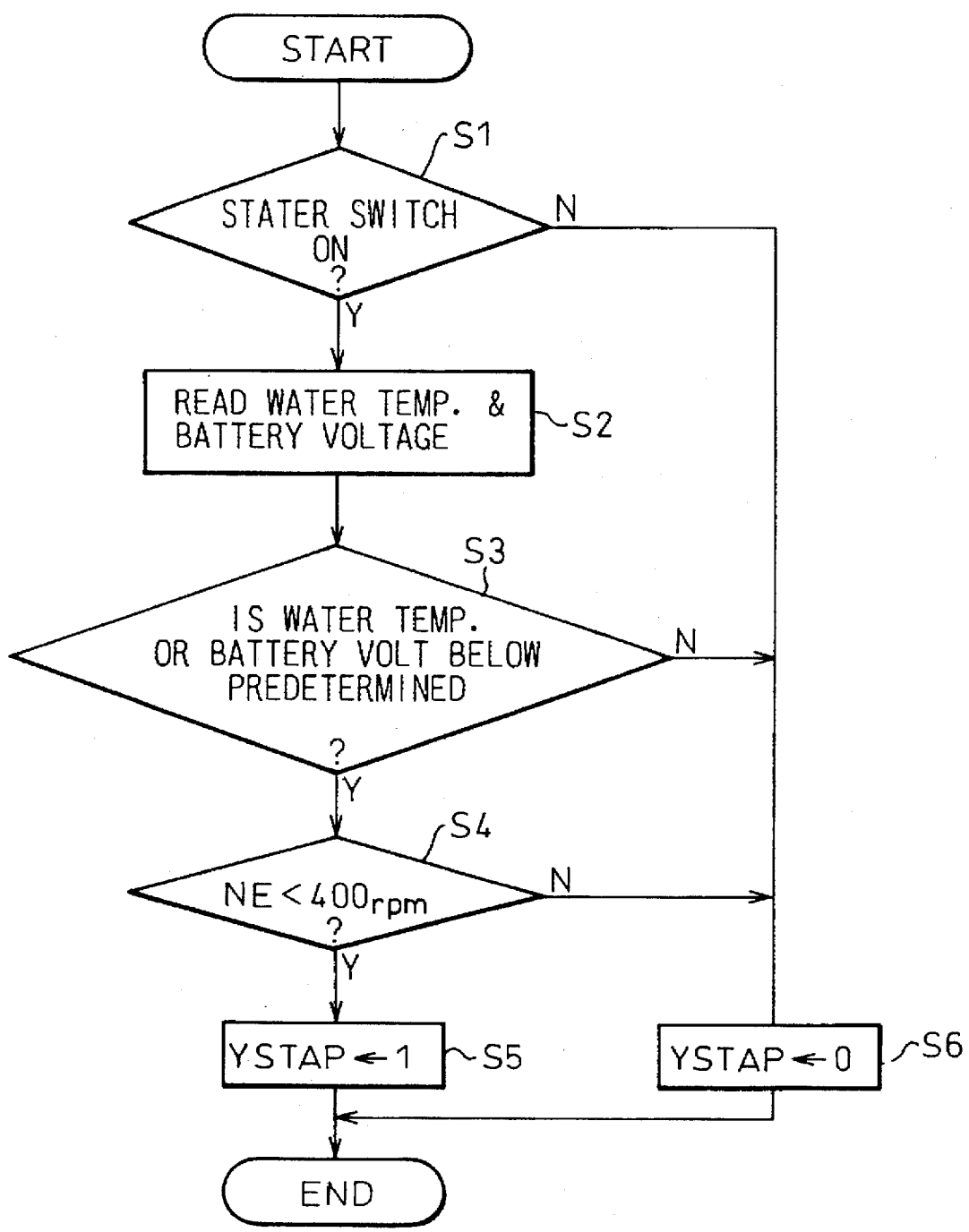
FIG. 2 is a flowchart showing a control process according to the first embodiment.

FIG. 2 is a flowchart showing a control process according to the first embodiment. This process is executed, for example, every 2 milli-seconds. This process is aimed at decreasing the pressure of the air in the intake air passage downstream of the throttle valve 6, namely, to decrease the air pressure in the intake manifold 2 and the surge tank 3 by activating the air pump 11 to suck the air therefrom so as to reduce the air pressure therein during the engine cranking operation. Here, the engine cranking operation means that the engine is operated to be driven by a starting motor during the time until the engine runs at the engine start-up time.

First, in step S1, whether or not the engine is in a starting operation is determined. This is determined by a signal from the starter switch 37 that indicates ON or OFF. When it is determined that the engine is in the starting operation, the output signal of the water temperature sensor 34 and the voltage of the battery 31 are read in step S2. Then, in step S3, whether or not the air pump 11 should be activated is determined. The step S3 is provided for deactivating the air pump 11 when the battery voltage is below a predetermined value since the power consumption of the air pump 11 is very large. The step S3 is also provided for determining whether it is necessary or not to decrease the air pressure in the intake air passage, in particular the surge tank 3, downstream of the throttle valve 6 during the engine cranking operation by activating the air pump 11. This is determined by the coolant temperature of the engine, that is, it is determined to stop activating the air pump 11 when the coolant temperature is over a predetermined value because injected fuel can be well atomized due to the warmed up wall surface in the intake manifold 2.

Figures 3, 4:
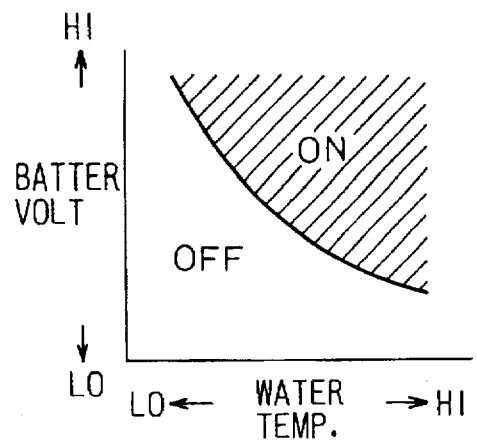
FIG. 3 is a map showing an operational area of an air pump.
FIG. 4 is a chart showing various combinations of operating states of an air pump and electromagnetic valves.

FIG. 3 is a map showing an operational area of an air pump. This map is used for determining whether or not the air pump 11 should be activated, and is previously stored in the ROM 23 in the ECU 20. It is determined that the air pump 11 should be activated when the coolant temperature and the battery voltage are in the ON area shown in FIG. 3.

In step S4, it is determining whether or not the engine is in a cranking operation. This is determined by the engine rotational speed calculated from the rotational speed sensor signal. In this embodiment, it is determined the engine is no longer in the cranking operation after the rotational speed has reached to 400 RPM, and the air pump 11 is deactivated.

In step S4, when the engine is determined to be in the cranking operation, step S5 proceeds. In the step S5, a flag YSTAP is set and the air pump 11 is activated to suck the air out of the surge tank 3. On the other hand, if it is determined that the engine is not in starting operation in the step S1, if it is determined that the air pump 11 should not be activated on a basis of the map in FIG. 3 with the coolant temperature and the battery voltage in the step S3, or if it is determined that the engine is started to be driven by its own expansion in the step S4, the flag YSTAP is reset and the air pump 11 is deactivated in step S6.

FIG. 4 is a chart showing various combinations of operating states of an air pump and electromagnetic valves. The chart shows each operational state of the air pump 11, the first electromagnetic valve 11 and the second electromagnetic valve 14 corresponding to the ON/OFF states of the flag YSTAP. The air pump 11 is activated for sucking the air inside the surge tank 3, the first port 12a is communicated with the second port 12b in the first electromagnetic valve 12, and the second electromagnetic valve 14 is fully opened when the flag YSTAP is set to 1. Thus, the air pump 11 sucks the air in the surge tank 3 and discharges it into the exhaust manifold 8, thereby decreasing the air pressure in the intake manifold 2 and accelerating the atomization of the fuel injected from the fuel injection valves 7.

On the other hand, when the flag YSTAP is reset to 0, the first port 12a is communicated with the third port 12c in the first electromagnetic valve 12 to prevent the air in the surge tank 3 from being sucked by the air pump 11, and the air pump 11 is controlled to be activated or deactivated and the second electromagnetic valve 14 is controlled to be properly opened, in response to the necessity of purifying the exhaust gas.

Figure 5:
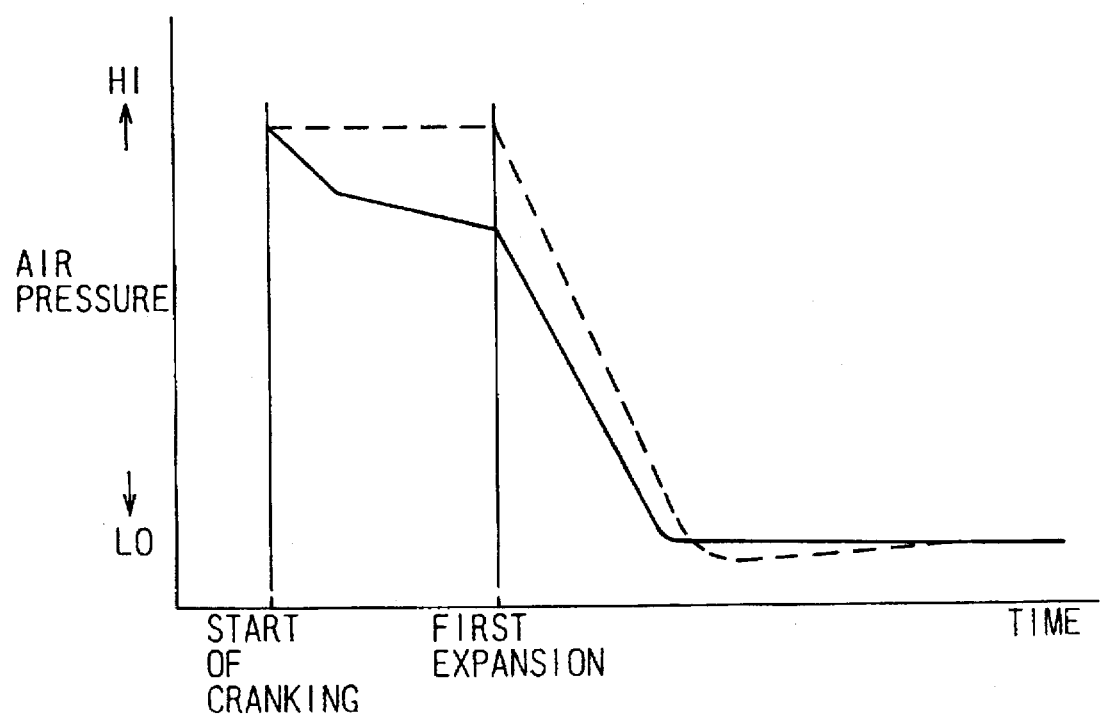
FIG. 5 is a timechart showing changes of the air pressure in an intake pipe according to the first embodiment.

FIG. 5 is a timechart showing changes of the air pressure, in an intake pipe according to the first embodiment, when the air pump 11 is controlled as explained above. In FIG. 5, a broken line indicates the result according to the prior art, while the solid line indicates the result according to the present invention. As can be also seen in FIG. 5, the air between the throttle valve 6 and the each intake valve 1b of the engine in the intake air passage is sucked by the air pump 11 and the air pressure in the intake air passage is reduced, thereby accelerating the atomization of the fuel injected from the injectors 7, and reducing the exhaust emissions. Furthermore, since the air pump 11, used for controlling the air/fuel ratio and that supplies the secondary air, is used, the additional cost required to carry out the present invention can be minimized. Hereinafter, the other embodiments will be explained.

Figure 6:
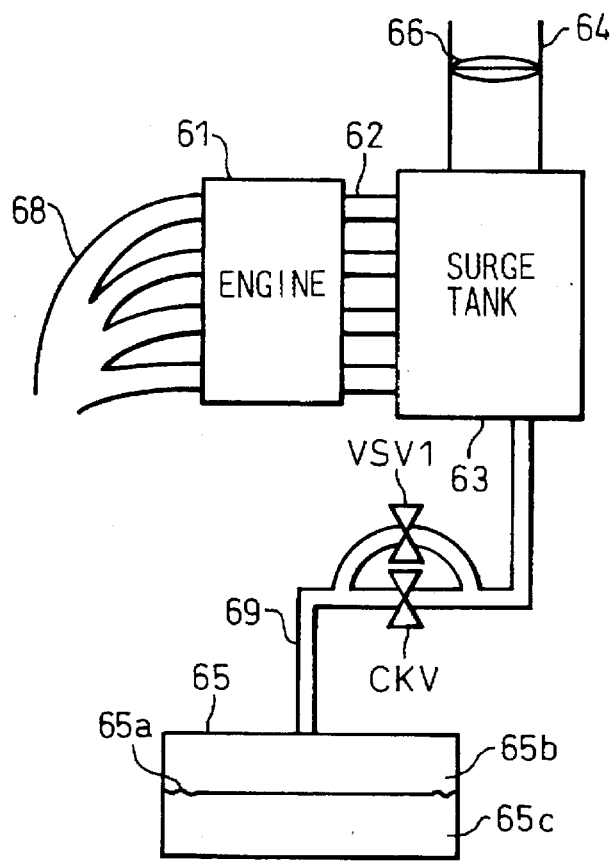
FIG. 6 is a schematic diagram showing a structure according to a second embodiment of the present invention.

FIG. 6 is a schematic diagram showing a structure according to a second embodiment of the present invention. For the purpose of decreasing the air pressure in the intake air passage downstream of the throttle valve during the engine cranking operation, an air pump was used in the first embodiment. Instead of the air pump, a vacuum tank, for example, a brake-booster generally installed in vehicles is used in the second embodiment. This enables a quick decrease in the air pressure in the intake air passage downstream of the throttle valve as compared with the first embodiment. In FIG. 6, 61 denotes an engine block, 62 denotes an intake manifold, 63 denotes a surge tank, 64 denotes an intake air duct, 65 denotes a brake-booster, 66 denotes a throttle valve, 68 denotes an exhaust manifold, and 69 denotes a passage between the surge tank 63 and the brake-booster 65. In the passage 69 is arranged an electromagnetic valve VSV1 that opens or closes the passage 69 between the surge tank 63 and the brake-booster 65. There is provided a check valve CKV in parallel with the valve VSV1. In normal operation of the engine 61, the air in the brake-booster 65 is sucked into the surge tank 63 via the check valve CKV by the pumping of cylinders in the engine 61, and the air pressure in the brake-booster 65 is kept vacuum. The electromagnetic valve VSV1 is controlled to open when the engine 61 is in cranking operation, and to decrease the air pressure in the intake air passage downstream of the throttle valve 66. The valve VSV1 is controlled to close when the engine 61 is not in cranking operation. Therefore, the valve VSV1 is closed when the engine is running so that the air in the surge tank 63 does not flow into the brake-booster 65.

The brake-booster 65 is divided into two chambers by a diaphragm 65a, such as a constant pressure chamber 65b in the upper chamber and a variable pressure chamber 65c in the lower chamber. There is provided a passage between the constant pressure chamber 65b and the variable pressure chamber 65c, not shown in FIG. 6. The passage is opened or closed by means of a valve not shown in FIG. 6. The variable pressure chamber 65c is further arranged to be able to communicate with the atmosphere. When the brake pedal is pressed, the passage is closed and the atmosphere flows into the variable pressure chamber 65c. This produces the pressure difference between the constant pressure chamber 65b and the variable pressure chamber 65c, thereby moving the diaphragm 65a along with a brake-piston not shown in FIG. 6 upward and generating the output torque of the brake-booster 65. When the brake pedal is released, the passage is opened and the atmosphere flows into the lower variable pressure chamber 65c is shut off. This cancels the pressure difference between the constant pressure chamber 65b and the variable pressure chamber 65c, thereby the air pressure in the both chambers 65b and 65c becomes a vacuum in preparation for the next braking operation. Next, the control method of the second embodiment will be explained.

Figure 7:
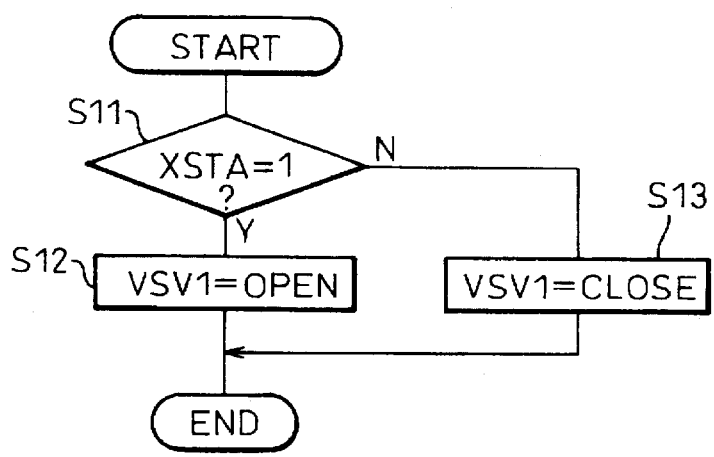
FIG. 7 is a flowchart showing a control process according to the second embodiment.

FIG. 7 is a flowchart showing a control process according to the second embodiment. This process is executed, for example, every 2 milli-seconds. First, in step S11, whether a flag XSTA is set or reset is decided. The flag XSTA is set to 1 until the engine rotational speed reaches to 400 RPM after the ignition key is turned on or when the staring motor is driven, and reset to 0 until the engine stops after the engine rotational speed has reached to 400 RPM. If the flag XSTA equals to 1, the process proceeds to step S12, if the flag XSTA equals to 0, the process proceeds to step S13. In step S12, the electromagnetic valve VSV1 is opened to open the passage between the surge tank 63 and the brake-booster 65 so that the air pressure in the surge tank 63 can be decreased to vacuum. In the step S13, the electromagnetic valve VSV1 is closed to shut off the passage. After executing the step S12 or the step S13, the cycle of this process ends.

Figure 8:
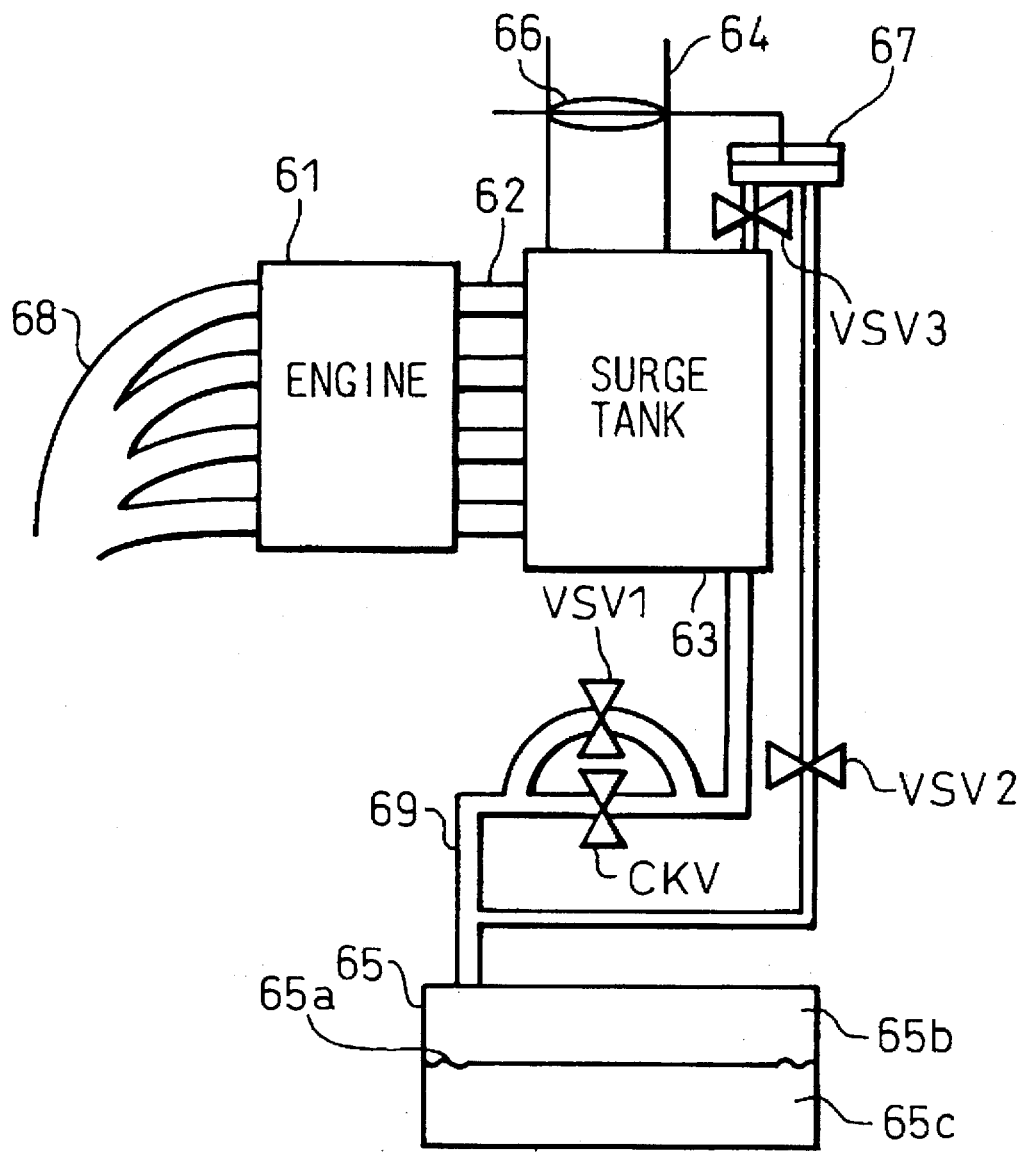
FIG. 8 is a schematic diagram showing a structure according to a third embodiment of the present invention.

FIG. 8 is a schematic diagram showing a structure according to a third embodiment of the present invention. In FIG. 8, the same reference numerals as shown in FIG. 6 indicate the same parts. The third embodiment shown in FIG. 8 is different from the second embodiment shown in FIG. 6 in that the throttle opener 67 and electromagnetic valves VSV2 and VSV3 are additionally used. According to the throttle opener 67, the throttle valve 66 is not allowed to close, for example, less than 5% of the full opening when the engine is not operated because the valve becomes sticky if the valve has been kept fully closed for a long time. The electromagnetic valve VSV3 that opens or closes a passage between the throttle opener 67 and the surge tank 63, is opened after the engine rotational speed has reached to a determined speed. By opening the valve VSV3, the lower limit, 5% of the full throttle is released by means of the vacuum pressure in the surge tank 63, thereby enabling to open or close the throttle valve 66 over the complete range of the opening.

As a variant of the third embodiment, the throttle valve 64 may be fully closed to avoid the air flow from the upstream to the downstream of the throttle valve 64 before activating the electromagnetic valve VSV1 to open the passage between the surge tank 63 and the brake-booster 65. To accomplish this, the lower limit of the throttle opener 67, as above explained, has to be released to fully close the throttle valve 64 during the engine cranking operation. In this case, the vacuum pressure in the surge tank 63 is insufficient for the use of the throttle opener 67, so the vacuum pressure in the brake-booster is used. That is, the electromagnetic valve VSV3 is closed and the electromagnetic valve VSV2, to open or close the passage between the throttle opener 67 and the brake-booster 65, is opened during the engine cranking operation, thereby releasing the lower limit of the throttle opener 67 to fully close the throttle valve 66 by means of the vacuum pressure in the brake-booster 65.

Then, the electromagnetic valve VSV1 to open or close the passage between the surge tank 63 and the brake-booster 65 is opened. The valve VSV2 is closed and the valve VSV3 is opened after the engine rotational speed has reached to the predetermined speed, namely, the cranking speed, thereby the pressure in the brake-booster 65 is reduced by means of the surge tank 63 rather than the brake-booster 65. Hereinafter, the process of the third embodiment will be explained.

Figure 9:
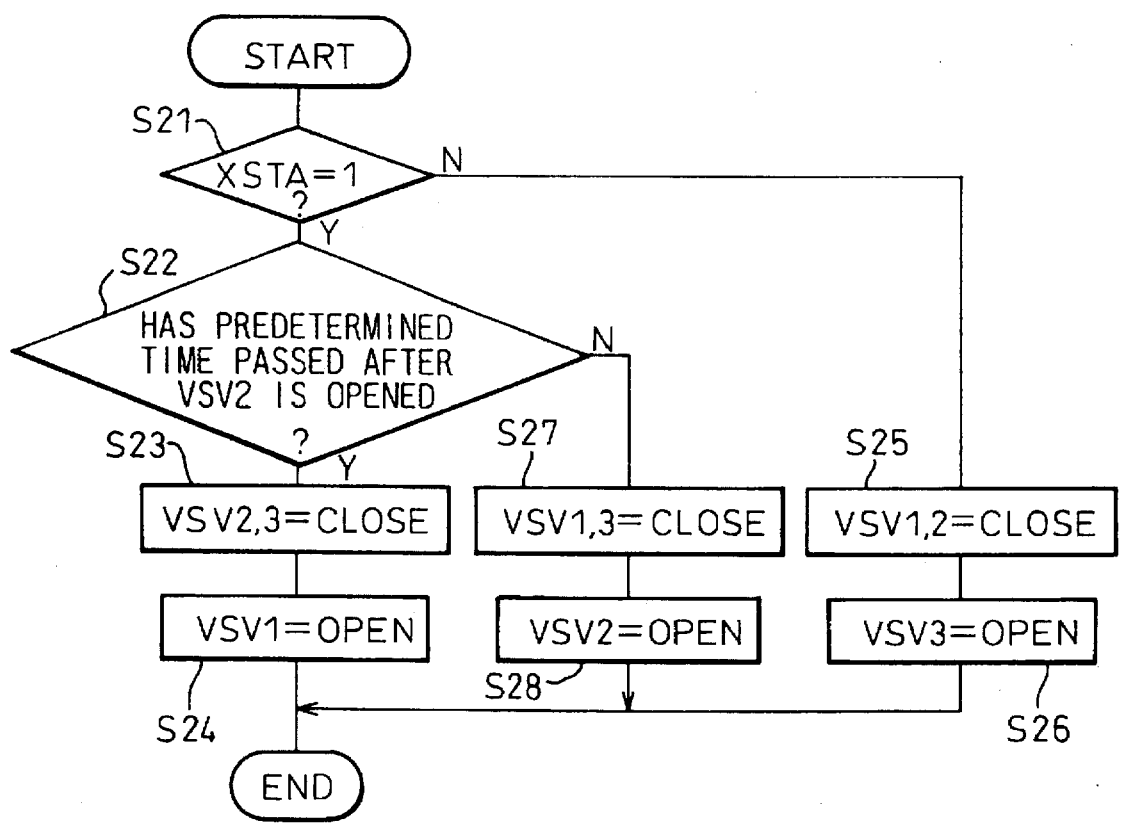
FIG. 9 is a flowchart showing a control process according to the third embodiment.

FIG. 9 is a flowchart showing a control process according to the third embodiment. This process is executed, for example, every 2 milli-seconds. First in step S21, whether a flag XSTA is set or reset is decided. The flag XSTA is set to 1 until the engine rotational speed reaches to 400 RPM after the ignition key is turned on or when the starting motor is driven, and reset to 0 until the engine stops after the engine rotational speed has reached to 400 RPM. If the flag XSTA equals to 1 in the step S21, the process proceeds to step S22, and if the flag XSTA equals to 0 in the step S21, the process proceeds to step S25. In the step S22, it is decided whether or not a predetermined time has passed after the electromagnetic valve VSV2 has been opened. If the result is YES in the step S22, the process proceeds to step S23, and if the result is NO in the step S22, the process proceeds to step S27. During the period of the predetermined time, both the electromagnetic valves VSV1 and VSV3 are closed in the step S27, then the electromagnetic valve VSV2 is opened in step S28. Thus, the lower limit of the throttle opener 67 is released. Here, the time required to fully close the throttle valve 66 is set to, for example, 50 milli-seconds. After this predetermined time has passed, the electromagnetic valves VSV2 and VSV3 are closed while keeping the lower limit of the throttle opener 67 released in the step S23, then the electromagnetic valve VSV1 is opened to allow the air in the surge tank 63 to flow into the brake-booster 65 in step S24. Then after the engine rotational speed has reached to 400 RPM, the electromagnetic valves VSV1 and VSV2 are closed in the step S25, and the electromagnetic valve VSV3 is opened to allow the air in the throttle opener 67 to flow into the surge tank 63 and keep the air in the throttle opener 67 at low pressure in step S26. In the step S26, the air in the throttle opener 67 is reduced to a vacuum by the normal means, that is, the surge tank 63 rather than the brake-booster 65. After the steps S24, S26 or S28 are executed, the cycle of this process ends. Next, a timechart showing changes of a vacuum pressure in the surge tank sucked by the air pump used for the first embodiment or the brake-booster used for the second or the third embodiments at the engine start-up time, will be explained.

Figure 10:
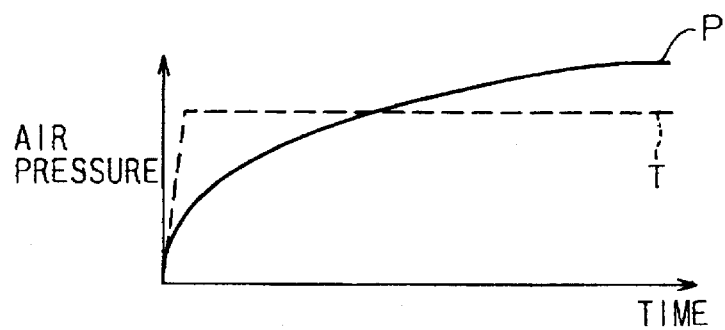
FIG. 10 is a timechart showing changes of the air pressure in a surge tank at the engine start-up time.

FIG. 10 is a timechart showing changes of the air pressure in a surge tank at the engine start-up time. In FIG. 10, the abscissa represents time, the ordinate represents air pressure in the surge tank. The curve P drawn by a solid line shows the pressure change in the surge tank at the engine start-up time according to the first embodiment, while the curve T drawn by a broken line shows the same according to the second or the third embodiments. According to the timechart, it is understood that the air pressure in the surge tank for a period of time right after the engine started up shown by the curve P is lower than that shown by the curve P.

In the above explained second and third embodiments, the brake-booster is used for the vacuum tank, a vacuum tank used for an actuator to exchange the drive mechanism between two wheels drive and four wheels drive can be also used instead of the brake-booster.

Another embodiment wherein the throttle valve 66 is replaced to an electronic throttle valve in the second embodiment can also be made. According to this embodiment, the throttle opener used in the third embodiment is not necessarily provided because the electronic throttle valve can be controlled such that the electronic throttle valve cannot be controlled to close less than 5% of the full throttle when the engine is stopped and to fully close the electronic throttle valve in the beginning of the engine cranking operation, and to open the electromagnetic valve VSV1 during the engine cranking operation after the electronic throttle valve has been fully closed, thereby decreasing the air pressure in the surge tank in the same way as the third embodiment.

As heretofore explained, according to the controller of the first to third aspects of the present invention, air in the intake air passage downstream of the throttle valve is actively pumped out to create a vacuum during the engine cranking operation, and the amount of the air sucked into the each combustion chamber is reduced, injected fuel is well atomized, the exhaust emissions, in particular the unburned HC emission, at the first engine expansion stroke of the engine are decreased, and the amount of the fuel deposited onto the inner wall of the intake pipe is decreased, and the production of overrich mixture of air and fuel in the combustion chambers after the engine cranking operation can be avoided.

According to the controller of the second aspect of the present invention, the air pump installed in normal vehicles is used, so that the complicated mechanism such as providing a plurality of intake air control valves or the like can be avoided, whereby the additional cost therefor can be saved.

According to the controller of the third aspect of the present invention, a vacuum tank is used instead of the air pump, the air in the intake air passage downstream of the throttle valve can be more quickly vacuumed as compared with the second aspect of the present invention that uses the air pump, and the injected fuel can be better atomized, and the amount of the exhaust unburned HC emission at the first expansion stroke of the engine can be reduced as compared with the second aspect of the present invention.

According to the controller of the third aspect of the present invention having a brake-booster as installed in most vehicles, a brake-booster is used for the vacuum tank and the additional cost required to carry out the present invention can be minimized.

According to the controller of the third aspect of the present invention, even in a case of a combustion engine having a means for keeping the throttle valve open to a predetermined degree of the opening, for example, in a case of a throttle opener, first the air flowing from upstream to downstream of the throttle valve is shut off, then passage between the vacuum tank and the intake air passage downstream of the throttle valve during the engine cranking operation is opened and thus the air pressure in the intake pipe can be surely lowered to the higher degree of vacuum.

It will be understood by those skilled in the art that the foregoing description is a preferred embodiment of the disclosed device and that various changes and modifications may be made in the invention without departing from the spirit and scope thereof.

We claim:

1. A combustion engine comprising:

a throttle valve;

an intake air passage downstream of the throttle valve; and means for decreasing air pressure in the intake air passage by actively withdrawing air out of the passage to reduce air flow to the engine during the engine cranking operation.

2. A controller for a combustion engine, comprising an air pump, means for communicating an inlet of the air pump either to the atmosphere or to an intake air passage downstream of a throttle valve, and means for changing the inlet of the air pump from the atmosphere to the intake air passage downstream of the throttle valve and to activate the air pump during the engine cranking operation.

3. A controller for a combustion engine, comprising a vacuum tank, means for opening or closing a passage between the vacuum tank and an intake air passage downstream of a throttle valve, and means for controlling the passage to be opened during the engine cranking operation.

4. A controller according to claim 3, wherein said vacuum tank is made from a brake-booster.

5. A controller according to claim 3, further comprising means for keeping the throttle valve open to a predetermined degree of the opening, and a means for shutting off the air flowing from upstream to downstream of the throttle valve before opening the passage between the vacuum tank and the intake air passage downstream of the throttle valve.

* * * * *